United States Patent
Daimler et al.

(10) Patent No.: US 11,256,672 B1
(45) Date of Patent: Feb. 22, 2022

(54) DATA MIGRATION AND INTEGRATION SYSTEM

(71) Applicant: Conexus ai, Inc., San Francisco, CA (US)

(72) Inventors: Eric Alexander Daimler, San Francisco, CA (US); Ryan Jacob Wisnesky, Boston, MA (US); David Isaac Spivak, Somerville, MA (US)

(73) Assignee: Conexus ai, Inc., San Francisco, CA (US)

( * ) Notice: Subject to any disclaimer, the term of this patent is extended or adjusted under 35 U.S.C. 154(b) by 150 days.

(21) Appl. No.: 16/844,810

(22) Filed: Apr. 9, 2020

Related U.S. Application Data

(60) Provisional application No. 62/832,214, filed on Apr. 10, 2019.

(51) Int. Cl.
*G06F 16/21* (2019.01)
*G06F 16/84* (2019.01)
*G06F 16/182* (2019.01)

(52) U.S. Cl.
CPC .......... *G06F 16/214* (2019.01); *G06F 16/182* (2019.01); *G06F 16/211* (2019.01); *G06F 16/86* (2019.01)

(58) Field of Classification Search
CPC .... G06F 16/214; G06F 16/182; G06F 16/211; G06F 16/86
See application file for complete search history.

(56) References Cited

U.S. PATENT DOCUMENTS

| | | | | |
|---|---|---|---|---|
| 6,665,677 | B1* | 12/2003 | Wotring | G06F 16/258 |
| 2010/0318494 | A1* | 12/2010 | Val | G06F 16/213 |
| | | | | 707/609 |
| 2019/0258614 | A1* | 8/2019 | Daniels | G06F 11/1451 |

OTHER PUBLICATIONS

Bush et al. Computing left Kan extensions. Journal of Symbolic Computation vol. 35, Issue 2. Feb. 2003. pp. 107-126.
Carmody et al. The Todd-Coxeter Procedure and Left Kan Extensions. Journal of Symbolic Computation. May 1995. https://doi.org/10.1006/jsco.1995.1027.
Deutsch et al. The chase revisited. PODS '08: Proceedings of the twenty-seventh ACM SIGMOD-SIGACT-SIGART symposium on Principles of database systems. Jun. 2008. pp. 149-158. https://doi.org/10.1145/1376916.1376938.

(Continued)

*Primary Examiner* — Cam Y T Truong
(74) *Attorney, Agent, or Firm* — Van Pelt, Yi & James LLP

(57) ABSTRACT

A data migration and integration system is disclosed. In various embodiments, the system includes a memory configured to store a mapping from a source schema to a target schema; and a processor coupled to the memory and configured to migrate to a target schema an instance of source data organized according to the source schema, including by using a chase engine to perform an ordered sequence of steps comprising adding a bounded layer of new elements to a current canonical chase state associated with migrating the source data to the target schema; adding coincidences associated with one or more of the target schema data integrity constraints and a mapping from the source schema to the target schema; and merging equal elements based on the coincidences; and repeat the preceding ordered sequence of steps iteratively until an end condition is met.

15 Claims, 8 Drawing Sheets

(56) References Cited

OTHER PUBLICATIONS

Fleming et al. A database of categories. Journal of Symbolic Computation vol. 35, Issue 2. Feb. 2003. pp. 127-135.
Haas et al. Clio grows up: from research prototype to industrial tool.. SIGMOD '05: Proceedings of the 2005 ACM SIGMOD international conference on Management of data. Jun. 2005. pp. 805-810. https://doi.org/10.1145/1066157.1066252.

* cited by examiner

⎫
⎬ 422
⎭

| Land' | Water' | Amphibian' | isAL' | isAW |
|---|---|---|---|---|
| lizard | fish | gecko | lizard | salamander |
| toad | salamander | frog | toad | newt |
| human | newt | | | |
| cow | dolphin | | | |
| horse | | | | |

→ F  426

⎫
⎬ 424
⎭

| Land | isLA | Water | isWA | Amphibian | isAL | isAW | Animal |
|---|---|---|---|---|---|---|---|
| lizard | gecko | fish | fish | gecko | lizard | salamander | fish |
| toad | frog | salamander | gecko | frog | toad | newt | frog |
| human | human | newt | frog | | | | dolphin |
| cow | cow | dolphin | dolphin | | | | human |
| horse | horse | | | | | | cow |
| | | | | | | | horse |
| | | | | | | | gecko |

| Land | isLA | Water | isWA | Amphibian | isAL | isAW | Animal |
|---|---|---|---|---|---|---|---|
| lizard | isLA(lizard) | fish | isWA(fish) | gecko | lizard | salamander | isLA(lizard) |
| toad | isLA(toad) | salamander | isWA(salamander) | frog | toad | newt | isLA(toad) |
| human | isLA(human) | newt | isWA(newt) | | | | isLA(human) |
| cow | isLA(cow) | dolphin | isWA(dolphin) | | | | isLA(cow) |
| horse | isLA(horse) | | | | | | isLA(horse) |
| | | | | | | | isWA(fish) |
| | | | | | | | ~~isWA(salamander)~~ |
| | | | | | | | ~~isWA(newt)~~ |
| | | | | | | | isWA(dolphin) |

504

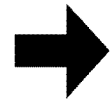

500D

| Land | isLA | Water | isWA | Amphibian | isAL | isAW | Animal |
|---|---|---|---|---|---|---|---|
| lizard | isLA(lizard) | fish | isWA(fish) | gecko | lizard | salamander | isLA(lizard) |
| toad | isLA(toad) | salamander | isWA(salamander) | frog | toad | newt | isLA(toad) |
| human | isLA(human) | newt | isWA(newt) | | | | isLA(human) |
| cow | isLA(cow) | dolphin | isWA(dolphin) | | | | isLA(cow) |
| horse | isLA(horse) | | | | | | isLA(horse) |
| | | | | | | | isWA(fish) |
| | | | | | | | isWA(dolphin) |

FIG. 5C

DATA MIGRATION AND INTEGRATION SYSTEM

CROSS REFERENCE TO OTHER APPLICATIONS

This application claims priority to U.S. Provisional Patent Application No. 62/832,214 entitled DATA MIGRATION AND INTEGRATION SYSTEM filed Apr. 10, 2019 which is incorporated herein by reference for all purposes.

GOVERNMENT LICENSE RIGHTS

This invention was made with government support under Small Business Innovation Research Program grant number 70NANB16H178, awarded by the National Institute of Standards and Technology, U.S. Department of Commerce. The government has certain rights in the invention.

BACKGROUND OF THE INVENTION

Data migration and integration systems have been provided to programmatically integrate data from separate databases into a single database. However, typical approaches do not scale well to migration and/or integration of very large data sets.

BRIEF DESCRIPTION OF THE DRAWINGS

Various embodiments of the invention are disclosed in the following detailed description and the accompanying drawings.

FIG. 4B illustrates the data migration of FIG. 4A as sets of tables.

FIGS. 5A through 5C illustrate an example of using a chase engine as disclosed herein to migrate data from schema C to schema D in various embodiments.

DETAILED DESCRIPTION

Figure 1A:
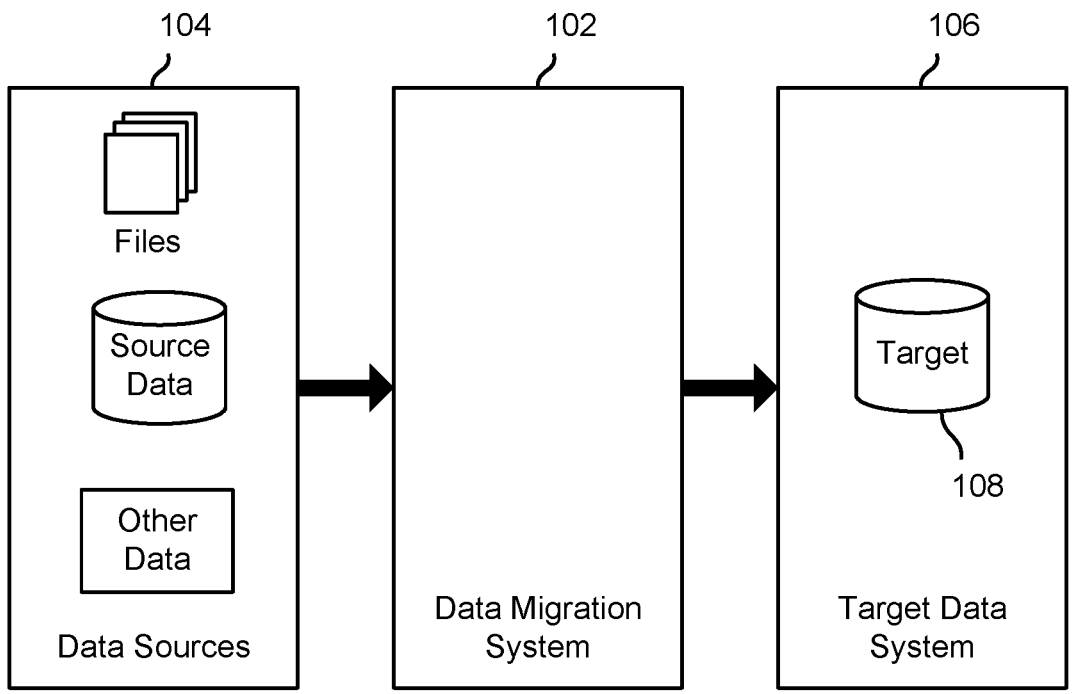
FIG. 1A is a block diagram illustrating an embodiment of a data migration system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to migrate and/or integrate large data sets are disclosed. In various embodiments, a data migration and integration system as disclosed herein determines programmatically a mapping to integrate a first database having a first schema into a second database having a second schema, such as to merge one database into another and/or to otherwise combine two or more structured data sets.

In various embodiments, a data migration and integration system as disclosed herein is configured to integrate data schema at least in part by computing left Kan extensions based on the "chase" algorithm from relational database theory. A breadth-first construction of an initial term model for a particular finite-limit theory associated with each left Kan extension is performed.

In various embodiments, left-Kan extensions are computed as disclosed herein. In various embodiments, a chase engine configured to implement a canonical chase algorithm as disclosed herein is used.

In various embodiments, left Kan extensions are used for data integration purposes, as disclosed herein, including without limitation as illustrated by the following examples:

Functorial data migration based ETL tool. In various embodiments, a CQL-based ETL tool is provided using techniques disclosed herein.

Universal Data Warehousing. In various embodiments, a 'universal data warehousing' design pattern provides an automated way to create a data warehouse from schema and data matching inputs by constructing colimits. These colimits are implemented in various embodiments as left Kan extensions, as disclosed herein, to perform data warehousing processes.

Meta catalog based on Semantic Search. In various embodiments, techniques disclosed herein are applied to provide semantic search capability (i.e., search guided by an ontology) across manufacturing service suppliers. In various embodiments, left Kan extensions are used to operate correctly.

In various embodiments, a data migration system as disclosed herein may include a data migration engine, referred to as "chase engine" in some embodiments, which is configured to migrate data from a source database, in some embodiments structured according to a source schema, to a target database having a target schema.

In some embodiments, data migration is performed using a chase engine that uses the chase algorithm from relational database theory to compute left-Kan extensions of set-valued functors. The chase engine constructs an initial model of a particular finite-limit theory associated with each left-Kan extension.

Left Kan extensions are used for many purposes in automated reasoning: to enumerate the elements of finitely-presented algebraic structures such as monoids; to construct semi-decision procedures for Thue (equational) systems; to compute the cosets of groups; to compute the orbits of a group action; to compute quotients of sets by equivalence relations; and more.

Left Kan extensions are described category-theoretically. Let C and D be categories and F:C→D a functor. Given a functor J:D→Set, where D→Set (also written $Set^D$) is the category of functors from D to the category of sets, Set, we define $\Delta_F(J):C \to Set:=J^\circ F$, and think of $\Delta_F$ as a functor from D→Set to C→Set. $\Delta_F$ has a left adjoint, which can be written as $\Sigma_F$, taking functors in C→Set to functors in D→Set. Given a functor I:C→Set, the functor $\Sigma F(I): D \to Set$ is called the left-Kan extension of I along F.

Left Kan extensions always exist, up to unique isomorphism, but they need not be finite, (i.e., $\Sigma_F(I)(d)$ may have infinite cardinality for some object d∈D, even when I (c) has finite cardinality for every object c∈C). In various embodiments, finite left-Kan extensions are computed when C, D, and F are finitely presented and I is finite.

In various embodiments, left-Kan extensions are used to perform data migration, where C and D represent database schemas, F a "schema mapping" defining a translation from C to D, and I an input C-database (sometimes referred to as an "instance") that is to be migrated to D. Typical previously-known left-Kan algorithms were impractical for large input instances, yet bore an operational resemblance to the chase algorithm from relational database theory, which is also used to solve data migration problems, and for which efficient implementations are known. The chase takes a set of formulae F in a subset of first-order logic known to logicians as existential Horn logic, to category theorists as regular logic, to database theorists as embedded dependencies, and to topologists as lifting problems, and constructs anF-model $chase_F(I)$ that is weakly initial among other such "F-repairs" of I.

In various embodiments, an implementation of a chase algorithm is used to compute a Left-Kan extension. In various embodiments, the chase, when restricted to the regular logic theories generated by left-Kan extension computations (so-called finite-limit theories), constructs strongly initial repairs. In some embodiments, a chase-based left-Kan extension algorithm as disclosed herein is implemented as a scalable chase engines (software implementation of chase algorithm), which supports the entirety of finite-limit logic. In various embodiments, the algorithm and implementation thereof are part of the categorical query language CQL, available at http://categoricaldata.net.

Various embodiments are described in connection with the accompanying Figures as described below.

FIG. 1A is a block diagram illustrating an embodiment of a data migration system. In the example shown, a data migration system 102 receives source data 104, such as a set of files, one or more source databases, and/or other sources of data, such as streamed data. In various embodiments, data migration system 102 transforms the data and provides the transformed data to a target data system 106 to be stored in a target database 108. In various embodiments, data migration system 102 is configured to transform the data from data sources 104 according to a schema of the target database 108 and a mapping that defines the relationship between data and structures of the source data 104 to corresponding entities and structures of the database 108.

In various embodiments, the transformation is performed at least in part using an implementation of a chase algorithm is used to compute a Left-Kan extension. In some embodiments, a data migration configured to implement a canonical chase algorithm as disclosed herein is used.

Figure 1B:
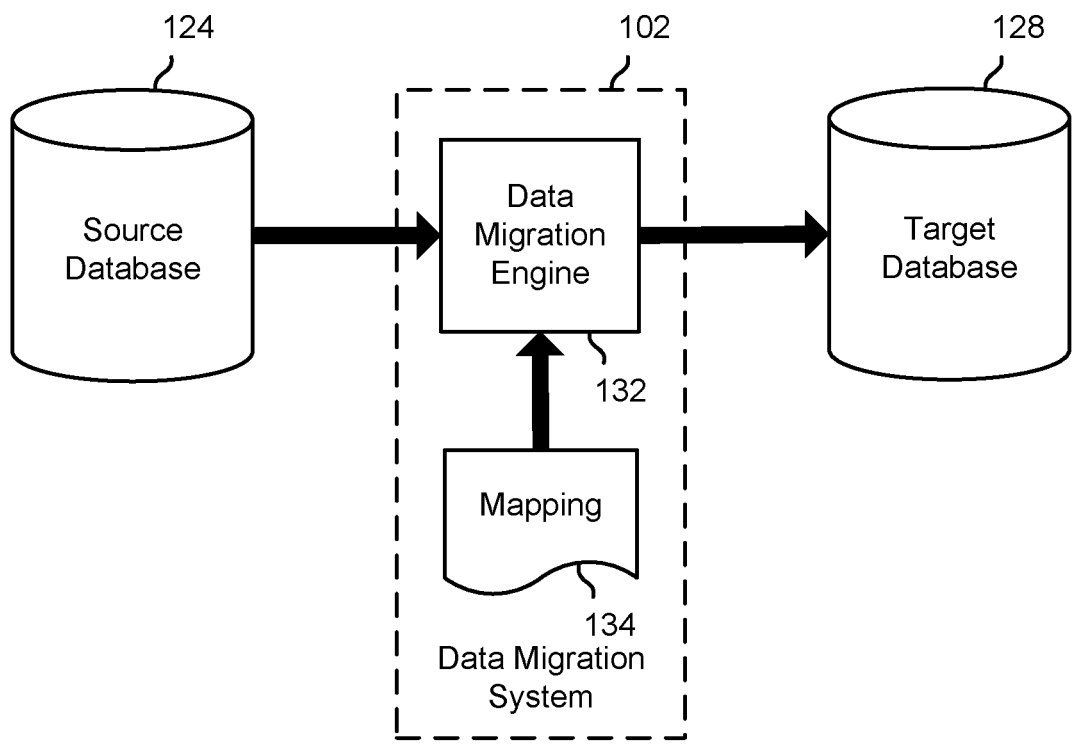
FIG. 1B is a block diagram illustrating an embodiment of a data migration system.

FIG. 1B is a block diagram illustrating an embodiment of a data migration system. In the example shown, data migration system 102 of FIG. 1A is configured to migrate data from a source database 124 to a target database 128. Data migration system 102 in this example is shown to include a data migration engine 132 configured to transform data from source database 124 according to a mapping 134 and to provide the transformed data to target database 128.

In various embodiments, the mapping 134 comprises at least in part a mapping expressed in a declarative language, such as the Categorical Query Language (CQL). In some embodiments, a migration tool is provided. Entities and structures from the source schema and the target schema are discovered and presented for mapping. A user with knowledge of the data and/or data domain uses the tool to identify and define mappings from source entities (data elements, relations, etc.) and structures (tables, etc.) to corresponding target entities and structures. The data migration system 132 interprets the received mapping 134 and uses the mapping to transform the source data to generate transformed data which is then stored in the target database 128.

In various embodiments, the data migration engine 132 is configured to transform data at least in part using an implementation of a chase algorithm is used to compute a Left-Kan extension. In some embodiments, a data migration configured to implement a canonical chase algorithm as disclosed herein is used.

Figure 2:
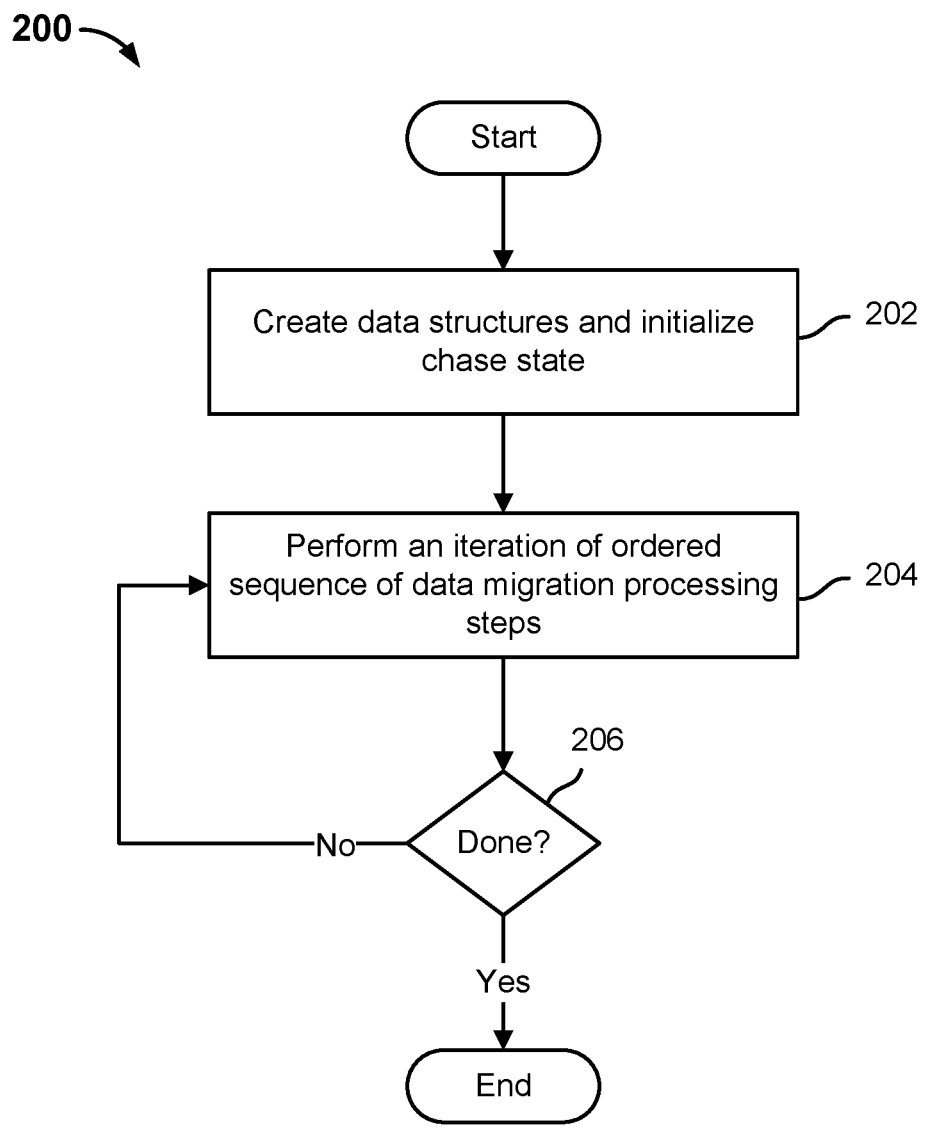
FIG. 2 is a flow chart illustrating an embodiment of a process to migrate data.

FIG. 2 is a flow chart illustrating an embodiment of a process to migrate data. In various embodiments, the process 200 of FIG. 2 may be implemented by a data migration system and/or engine, such as data migration system 102 of FIGS. 1A and 1B and data migration engine 132 of FIG. 1B. In the example shown, at step 202 data structures (e.g., tables) according to the target schema are created and initialized to an initial chase state. At step 204, an iteration of a set of ordered data migration processing actions is performed. In various embodiments, the set of ordered data migration processing actions comprises a step or iteration of a canonical chase algorithm as disclosed herein. At step 206, it is determined whether any further steps or actions are to be performed. In various embodiments, a determination at step 206 that nor further steps or actions are to be performed is based at least in part on a determination that no (further) action in the set of ordered data migration processing actions performed in each iteration of step 204 is to be performed based on the current state of the "chase". If no further steps or actions are to be performed (206), the process ends. If further steps or actions are to be performed (206), a next iteration of the set of ordered data migration processing actions is performed at step 204. Successive iterations of step 204 are performed until it is determined at 206 that no further operations are to be performed, upon which the process ends.

Figure 3:
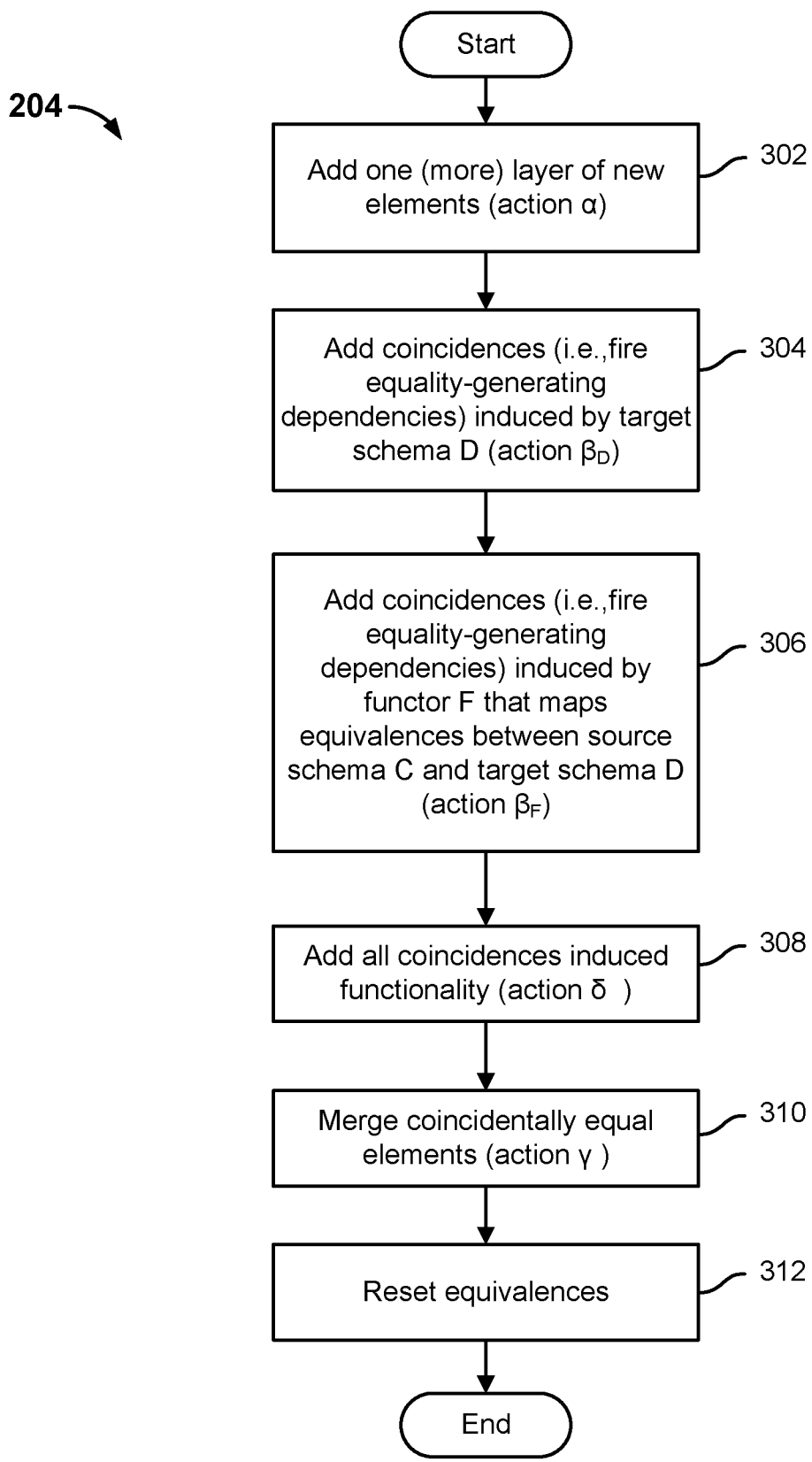
FIG. 3 is a flow chart illustrating an embodiment of a process to perform a canonical chase step.

FIG. 3 is a flow chart illustrating an embodiment of a process to perform a canonical chase step. In various embodiments, the process of FIG. 3 comprises a set of ordered data migration processing actions performed to implement step 204 of FIG. 2. In the example shown, at 302 a single, bounded layer of new elements is added to a set of data structures used to store a current chase state, sometimes referred to herein as "action α". At 304, coincidences induced by target schema D (sometimes referred to as "action $\beta_D$") are added to the chase state. In some embodiments, the term "adding coincidences" in the context of data migration may equate to "firing equality-generating dependencies". At 306, coincidences induced by functor F that maps equivalences between source schema C and target schema D (sometimes referred to as "action $\beta_F$") are added. At 308, all coincidences induced functionality (sometimes referred to as "action δ") are added. At 310, coincidentally equal elements are merged (sometimes referred to as (sometimes referred to as "action γ"). Finally, at 312 equivalences are reset in preparation for a (potential) next iteration of the process of FIG. 3 (e.g., step 204 of FIG. 2).

In various embodiments, steps 302, 304, 306, 308, 310, and 312 are performed in the order shown in FIG. 3.

Operation of the data migrations systems of FIGS. 1A and 1B and the data migration processes of FIGS. 2 and 3 as implemented in various embodiments as applied to a specific instance of a source data C to be transformed according to a mapping F to a target schema D is illustrated below with reference to FIGS. 4A, 4B, 5A, 5B, and 5C.

Figure 4A:
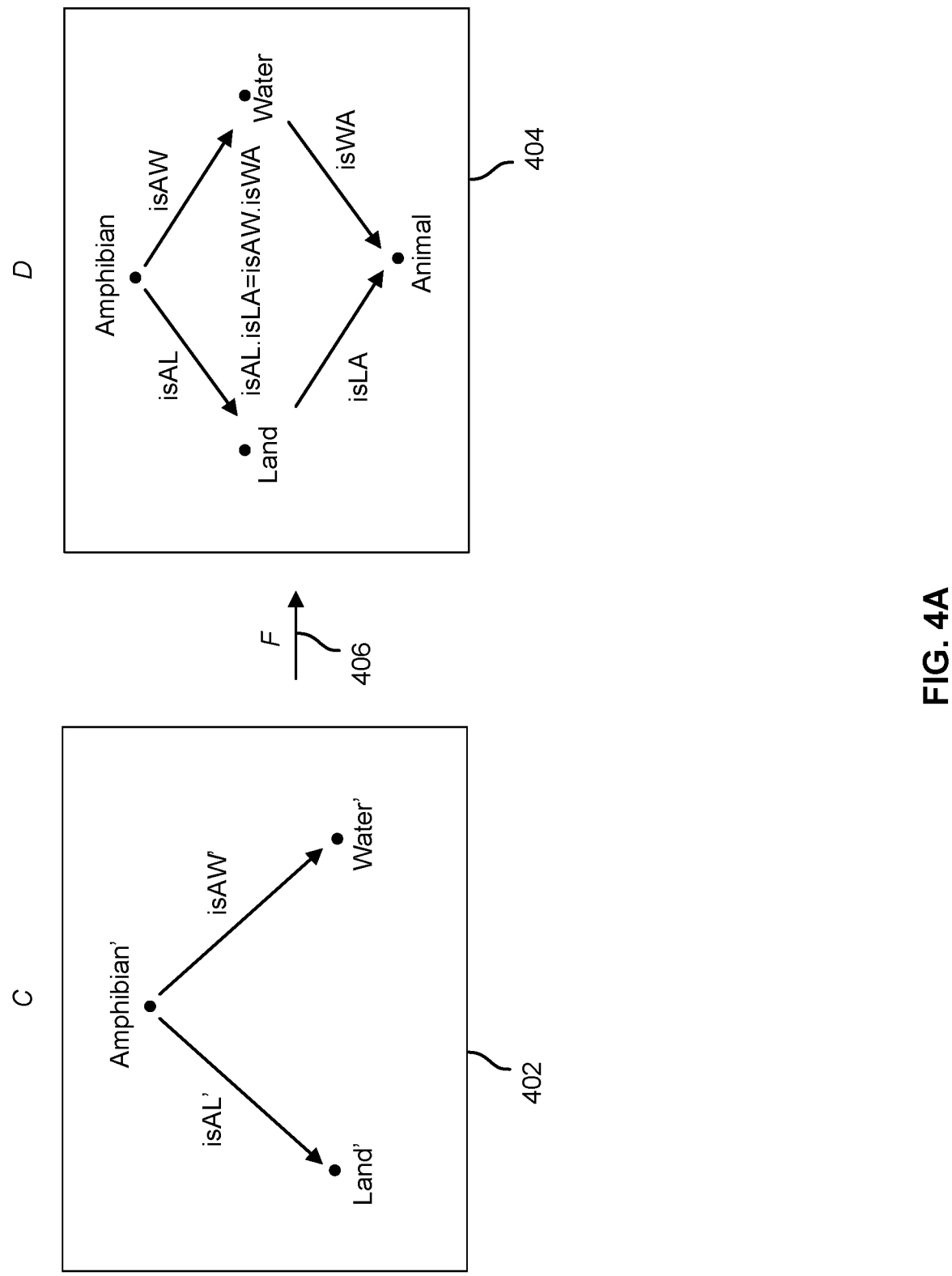
FIG. 4A illustrates an example of a data migration from a database instance 402 according to a schema C to a target schema D 404 via a mapping (functor) F 406.

FIG. 4A illustrates an example of a data migration from a database instance 402 according to a schema C to a target schema D 404 via a mapping (functor) F 406. In various embodiments, techniques disclosed herein are used to migrate data from C to D, as shown in FIG. 4A.

The example shown in FIG. 4A is a left-Kan extension that is an example of quotienting a set by an equivalence relation, where the equivalence relation is induced by two given functions. In this example, the input data 402 consists of amphibians, land animals, and water animals, such that every amphibian is exactly one land animal and exactly one water animal. All of the animals (see 404) without double-counting the amphibians, which can be done by taking the disjoint union of the land animals and the water animals and then equating the two occurrences of each amphibian.

As shown in FIG. 4A, source category C 402 is the span Land'←Amphibian'→Water', target category D 404 extends C into a commutative square with new object Animal and no prime (') marks, and the functor F 406 is the inclusion.

FIG. 4B illustrates the data migration of FIG. 4A as sets of tables. Specifically, input functor I:C→Set, displayed with one table per object, is shown in FIG. 4B as tables 422, which in this example are migrated to tables 424 (schema D) via mapping (functor) F 426. In tables 422, frogs are double counted as both toads and newts, and the left-Kan extension (i.e., the table Amphibian') equates them as animals. Similarly, geckos are both lizards and salamanders. Thus, one expect 5+4−2=7 animals in $\Sigma_F$ (I). However, there are infinitely many left-Kan extensions $\Sigma_F$ (I); each is naturally isomorphic to the tables 424 of FIG. 4B in a unique way. That is, the tables 424 uniquely define $\Sigma_F$ (I) up to choice of names.

Because in this example F is fully faithful, the natural transformation $\eta_I: I \to \Delta_F (\Sigma_F (I))$, i.e. the unit of $\Sigma_F \dashv \Delta_F$ adjunction, is an identity of C-instances; it associates each source Land' animal to the same-named target Land animal, etc.

In various embodiments, the left-Kan extension ΣF (I): D→Set of functors F:C→D and I:C→Set is computed by using a chase engine to invoke a chase algorithm on I and a theory col(F) associated with F, called the collage of F.

In various embodiments, left-Kan extensions are computed to perform data migration using a chase engine in which that implements an algorithm in which each action corresponds to "firing of a dependency" in the traditional sense of the chase. Because a chase algorithm to compute left-Kan extensions as disclosed herein is completely deterministic and yields a result up to unique isomorphism, in some embodiments the algorithm is referred to as the "canonical chase".

In various embodiments, the input to the canonical chase as disclosed herein includes two finite presentations of categories, a finite presentation of a functor, and a set-valued functor presented as a finite set of finite sets and functions between those sets. In some embodiments, such an input includes:

A finite set C, the elements of which we call source nodes.
For each $c_1, c_2 \in C$, a finite set C ($c_1, c_2$), the elements of which we call source edges from $c_1$ to $c_2$. We may write f:$c_1 \to c_2$ or $c_1 \to f c_2$ to indicate f∈C ($c_1, c_2$).
For each $c_1, c_2 \in C$, a finite set C E($c_1, c_2$) of pairs of paths $c_1 \to c_2$, which we call source equations. By a path p:$c_1 \to c_2$ we mean a (possibly 0-length) sequence of edges $c_1 \to \ldots \to c_2$.
A finite set D, the elements of which we call target nodes.
For each $d_1, d_2 \in D$, a finite set D($d_1, d_2$), the elements of which we call target edges from $d_1$ to $d_2$.
For each $d_1, d_2 \in D$, a finite set DE($d_1, d_2$) of pairs of paths $d_1 \to d_2$, which we call target equations.
A function F:C→D.
For each $c_1, c_2 \in C$, a function F$c_1, c_2$ from edges in C ($c_1, c_2$) to paths F ($c_1$)→F ($c_2$) in D. We will usually drop the subscripts on F when they are clear from context. We require that if $p_1$ and $p_2$: $c_1 \to c_2$ are equivalent according to C E, the two paths F ($p_1$) and F ($p_2$) are equivalent according to DE.
For each c∈C, a set I (c), the elements of which we call input rows.
For each edge g:$c_1 \to c_2 \in C$, a function I ($c_1$)→I ($c_2$). Whenever paths $p_1$ and $p_2$ are provably equal according to C E, we require that I ($p_1$) and I ($p_2$) be equal as functions.

The above data determines category C (resp. D), whose objects are nodes in C (resp. D), and whose morphisms are equivalence classes of paths in C (resp. D), modulo the equivalence relation induced by C E (resp. DE). Similarly, the above data determines a functor F:C→D and a functor I:C→Set. In various embodiments, the source equations C E are not used by a chase algorithm as disclosed herein, but are required to fully specify C.

In various embodiments, a canonical chase as disclosed herein runs in rounds, possibly forever, transforming a state consisting of a col(F) pre-model until a fixed point is reached (i.e., no more rules/actions apply). In general, termination of the chase is undecidable, but conservative criteria exist based on the acyclicity of the "firing pattern" of the existential quantifiers 10] in the finite-limit theory corresponding to DE described above. In various embodiments, the state of a canonical chase algorithm as disclosed herein includes:

For each d∈D, a set J(d), the elements of which we call output rows. J is initialized in the first round by setting $J(d) := \sqcup_{(c \in C | F(c) = d)} I(c)$
For each edge d∈D, an equivalence relation $\sim_d \subseteq J(d) \times J(d)$, initialized to identity at the beginning of every round.
For each edge f:d1→d2∈D, a binary relation J(f)⊆J($d_1$)× J($d_2$), initialized in the first round to empty. When the chase completes, each such relation will be total and functional.
For each node c∈C, a function η(c):I(c)→J(F c)). η is initialized in the first round to the co-product/disjoint-union injections from the first item, i.e., η(c)(x)=(c,x).
Given a path p: $d_1 \to d_2$ in D, we may evaluate p on any x∈J ($d_1$), written p(x), resulting in a (possibly empty) set of values from J ($d_2$) (a set because each J (f) is a relation). Given a state, we may consider it as a col(F) pre-model in the obvious way by extending ~into a congruence (e.g., so that x~y and J (f)(x, a) implies J (f)(y, a)).

In various embodiments, a canonical chase algorithm as disclosed herein consists of a fully deterministic sequence of state transformations, up to unique isomorphism. In some embodiments, a chase algorithm as disclosed herein comprises an equivalent sequence of transformations, in some embodiments executed in bulk.

A step of a canonical chase algorithm as implemented in various embodiments comprises applying the actions below to the canonical chase state in the order they appear in the following list:

Action α: add new elements. For every edge g: $d_1 \rightarrow d_2$ in D and x∈J ($d_1$) for which there does not exist y∈J ($d_2$) with (x, y)∈J (g), add a fresh (not occurring elsewhere) symbol g(x) to J ($d_2$), and add (x, g(x)) to J (g), unless x was so added. Note that this action may not force every edge to be total (which might lead to an infinite chain of new element creations), but rather adds one more "layer" of new elements.

Action $β_D$: add all coincidences induced by D. The phrase "add coincidences" is used where a database theorist would use the phrase "fire equality-generating dependencies". In this action, for each equation p=q in DE($d_1$, $d_2$) and x∈J ($d_1$), we update $d_2$ to be the smallest equivalence relation also including {(x', x")|x'∈p(x), x"∈q(x)}.

Action $β_F$: add all coincidences induced by F. This action is similar to the action above, except that the equation p=q comes from the collage of F and evaluation requires data from η and I in addition to J.

Action δ: add all coincidences induced functionality. For every (x, y) and (x, y') in J (f) for some f:$d_1 \rightarrow d_2$ in D with y≠y', update ~$d_2$ to be the smallest equivalence relation also including (y, y'). This step makes into a congruence, allowing us to quotient by it in the next action.

Action γ: merge coincidentally equal elements. In many chase algorithms, elements are equated in place, necessitating complex reasoning and inducing non-determinism. In various embodiments, a canonical chase algorithm as disclosed herein is deterministic: action α adds a new layer of elements, and the next action add to ~. In this last action (γ), we replace every entry in J and η with its equivalence class (or representative) from ~, and then ~resets on the next round.

Figure 5A:
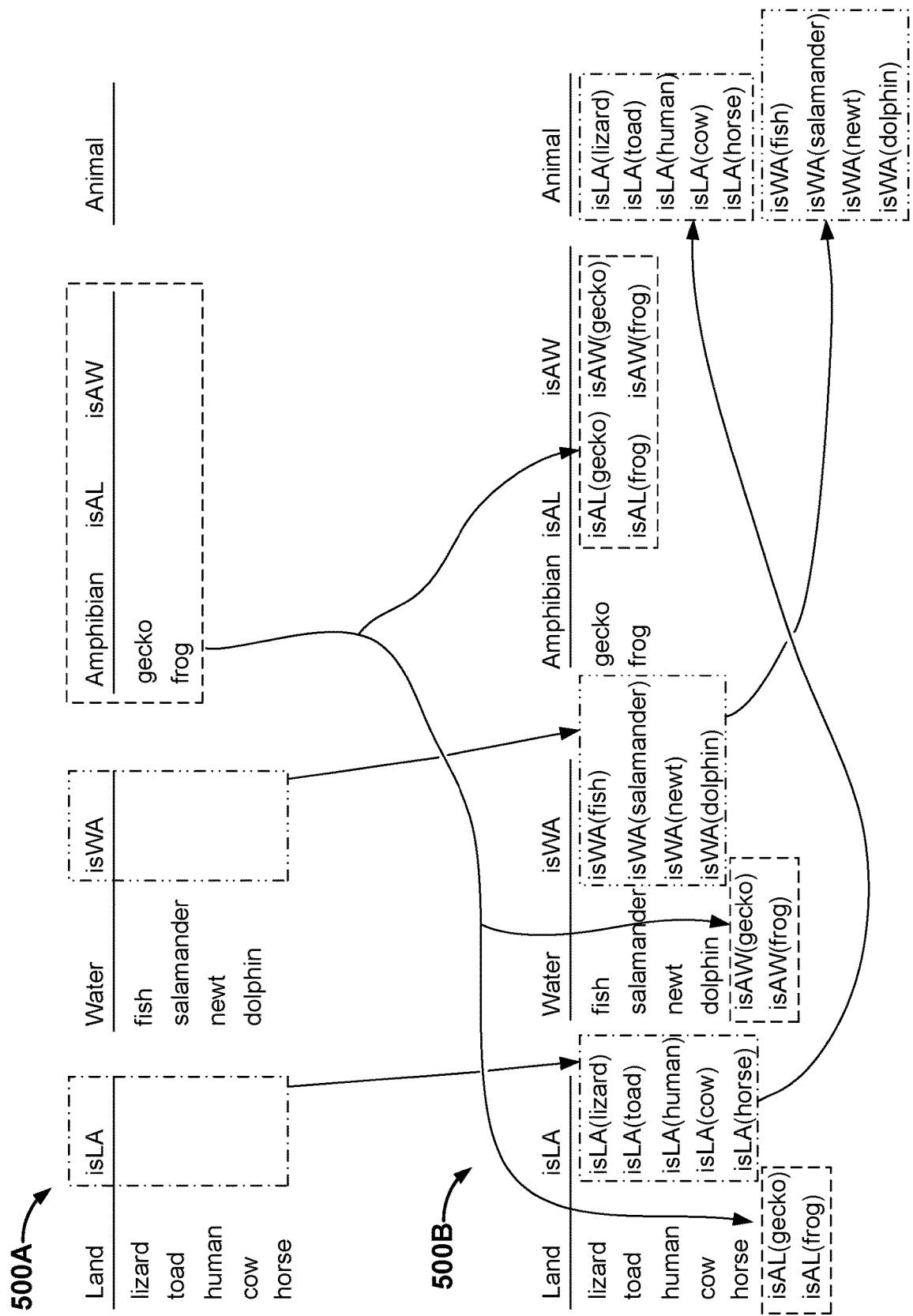
Figure 5B:
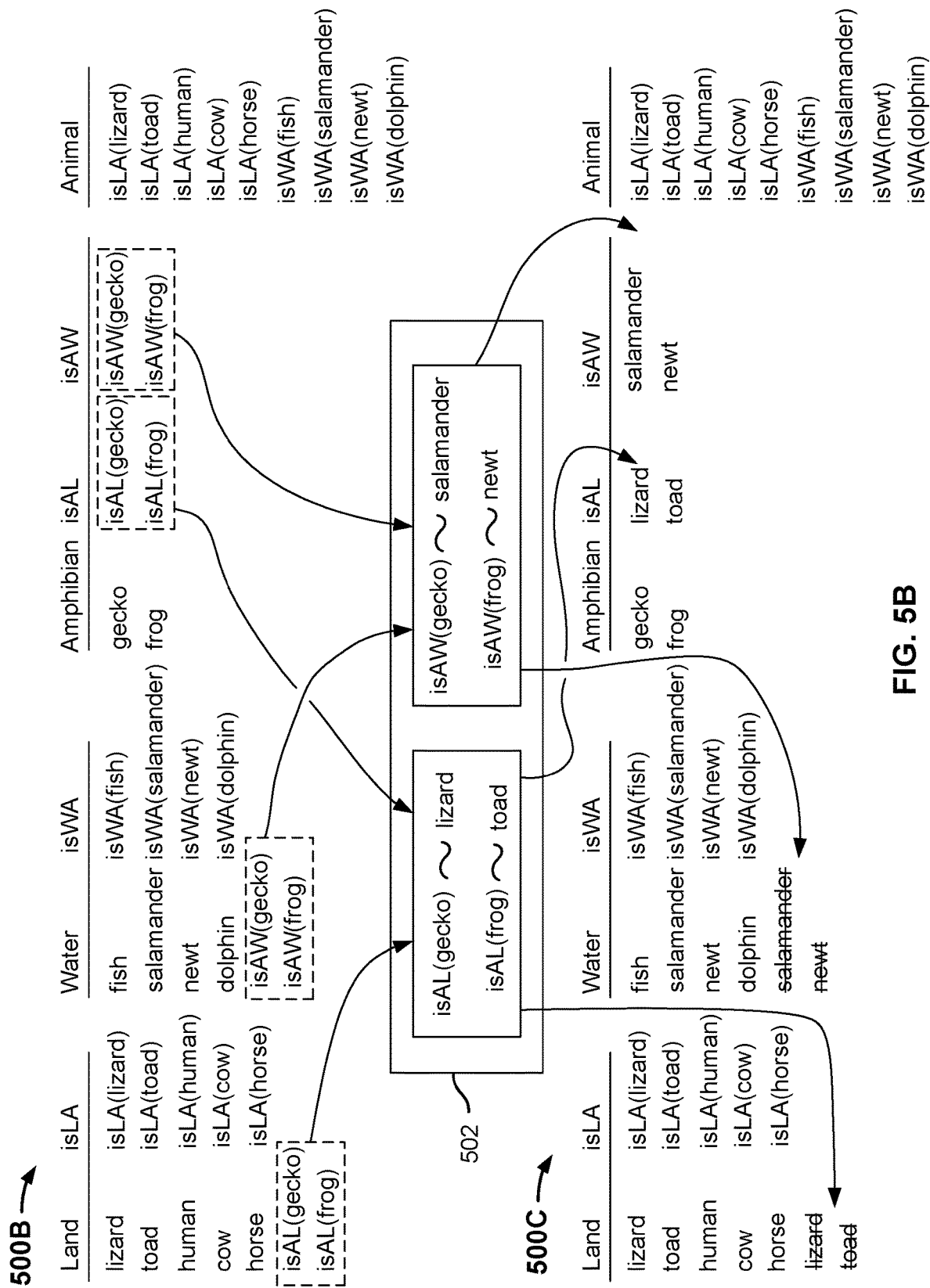

FIGS. 5A through 5C illustrate an example of using a chase engine as disclosed herein to migrate data from schema C to schema D in various embodiments. In various embodiments, the example shown in FIGS. 5A through 5C illustrate application of a canonical chase algorithm as disclosed herein to migrate the instance of C shown in FIGS. 4A and 4B to the schema D.

In various embodiments, a data migration engine/system as disclosed herein begins by initializing the chase state, as in step 202 of FIG. 2, e.g., by creating tables or other data structures corresponding to the target schema and copying from the source data values for the first column of each table in the target schema for which corresponding data exists in the source data. In some embodiments, auxiliary data structures used in subsequent data migration processing steps and actions are initialized.

Comparing the source data tables 422 of FIG. 4B with the example initial chase state 500A shown in the upper part of FIG. 5A, one can see that the first column of each of the "Land", "Water", and "Amphibian" tables has been populated with corresponding data from the corresponding source tables 422 in FIG. 4B.

Once the chase state has been initialized (500A of FIG. 5A), a single, bounded layer of new elements is added to the tables comprising the chase state, as in step 302 of FIG. 3 (action α). In various embodiments, the target schema tables, data integrity constraints, and current chase state are used to determine the bounded layer of elements to be added. In the context of a left Kan extension, the target data integrity constraints include the equations in the target schema, as well as the formulae in other logics (e.g. regular logic) derived from them. In the example shown in FIG. 5A, the target schema tables and data integrity constraints (e.g., "isLA", "isWA", "isAL", and "isAW"), and the current chase state (500A) are used to add elements, as shown in resulting chase state 500B.

In various embodiments, in each iteration of step 302 of FIG. 3 (action α), a single layer of new elements is added to the chase state's "term model" in a "breadth first" way, i.e., once an element X is added the system does not add more things based on X in the current iteration of the action/step.

Next, coincidences (actions $β_D$, $β_F$, and δ, as in steps 304, 306, and 308 of FIG. 3) are added. In the example shown in FIG. 5B, the single target equation in D induces no equivalences, because of the missing values (blank cells) in the isLA and isWA columns, so action $β_D$ does not apply (because there are no values to which to apply the action/rule). Action $β_F$ requires that isAL and isAW be copies of isAL' and isAW' (from the source schema C), inducing the equivalences shown in box 502 of FIG. 5B. In this example, the relations corresponding to the edges relations are all functions, so action δ does not apply. In a different example than the one shown, e.g., action δ may force element "a" and "b": that are the same "water animal" to be the same "animal".

Next, coincidentally equally elements are merged (action γ, as in step 310 of FIG. 3), resulting in the chase state transitioning from chase state 500B (bottom of FIG. 5A and top of FIG. 5B) to chase state 500C as shown in FIG. 5B. In this example, the strike-through of the entries for "lizard" and "toad" in the Land table and "salamander" and "newt" in the Water table, resulting from the applicable equivalences 502, reflects those entries being subsumed into the identical entries that were already present in those tables.

In this example, in the second and final round, no new elements are added (i.e., there are no more elements to be migrated and no further relations/constraints of the target schema that imply or require additional elements) and one action adds coincidences, flp. In particular, it induces the equivalences shown in boxes 504 of FIG. 5C:

isLA(lizard)~isWA(salamander) isLA(toad)~isWA(newt)

which, after merging, leads to a final state 500D as shown in FIG. 5C.

The final chase state 500D shown in FIG. 5C is uniquely isomorphic to the example output tables 424 shown in FIG. 4D. The actual choice of names in the tables 500D is not canonical but not unique, as one would expect for a set-valued functor defined by a universal property, and different naming strategies are used in various embodiments.

In various embodiments, a data migration engine/system as disclosed herein minimizes memory usage by storing cardinalities and lists instead of sets. In some such embodiments, a left-Kan chase state consists of:

1. For each d∈D, a number J(d)≥0 representing the cardinality of a set.
2. For each d∈D, a union-find data structure based on path-compressed trees $\sim d \subseteq \{n | 0 \leq n < J(d)\} \times \{n | 0 \leq n < J(d)\}$.
3. For each edge f:d1→d2∈D, a list of length J (d1), each element of which is a set of numbers ≥0 and <J(d2).
4. For each c∈C, a function $\eta(c):I(c) \to \{n | 0 \leq n < J(F(c))\}$.

While a number of examples described above apply techniques described herein to data migration/integration, in various embodiments techniques disclosed herein are applied to other contexts.

For example, and without limitation, in various embodiments techniques disclosed herein are used in various independent 'operating/database system' embodiments as well as various independent 'vertical/industry specific' embodiments, including without limitation one or more of the following:

Isomorphism up to privacy/anonymity. The left Kan extension concept is a purely structural one; it is not possible for CQL or other data migrations systems to distinguish between isomorphic instances. Such set-valued functors constructed by Kan extension, including as done by CQL, have extremely pleasing privacy properties, because by definition they contain no data that could be leaked, period; they contain only structure (links between meaningless identifiers). In various embodiments, scalable databases with this property are enabled by wrapping existing databases with CQL. For example, we can replace 'Gecko' with '1' in the output of a left kan extension and still have a left kan extension, thereby anonymizing Gecko and maintain the Gecko's privacy Automatic versioning. Left Kan extensions have suitable semantics for schema evolution and they compose and have a right adjoint; in various embodiments these attributes are used to enable 'automatic versioning' of SQL systems by CQL schema mappings and sigmas. The example in this disclosure can be thought of as evolving the 3 table schema to have a fourth, animals table.

Terms as Provenance. The 'lineage' of a data migration formalized by a left Kan extension can be captured using terms. Since left Kan extensions are universal in the sense of category theory, provenance through Sigma is provided in various embodiments. In this example, although the choice of names is not unique, we can choose a naming scheme to encode how the name is constructed, thereby preserving the provenance of each output row.

Parallel Left Kan Computation. Although identities such as Sigma_F(I+J)=Sigma_F(I)+Sigma_F(J) are known, computing Left Kan extensions in parallel via parallel chase engines is disclosed, enabling massive scalability of operations such as group orbit, or coset enumeration, and initial term model construction for algebraic theories.

Columnar/Skeletal storage. In various embodiments, the left Kan extension algorithm as described herein makes use of a skeletal storage strategy, where only cardinalities of sets, rather than sets, are stored whenever possible. This strategy is related to but distinct from the concept of virtual row numbers in columnar databases. In various embodiments, columnar stores (MonetDB, Vertica, etc), are optimized using theory about the "Skeleton" of the category of sets.

Rapid creation of initial term models for algebraic theories is enabled in various embodiments.

Embodiments of the present system are configured in some embodiments to provide data integration services in divisible parts unrelated to the number of people using the system. Examples include offering integration solutions measured by types of integrations, number of integrations, size of integrations, complexity of integrations, duration of integration, permanence of integration, bandwidth required of integration, storage required of integration, processing power required of integration, and tools required to complete integration.

In various embodiments, the present system may be provided on one premise or via a cloud infrastructure. The present system may be provided via multiple cloud systems.

In some embodiments, the present system may include tools together or separately. These may be configured via a SaaS platform or PaaS platform. For example, the system may provide capabilities to deliver the capabilities to manage the whole of the data integration task. Other modules may include the ability to intake larger sized data sets or process the data integration more quickly. By utilizing the services provided by a PaaS platform, other shared services may be included in the deployment and pricing of the system.

In some embodiments, the present system may make available interactions to the system through command line programming commands. In some embodiments the present system may allow for interactions to the system through a Graphical User Interface (GUI).

In certain embodiments, functionality may include capabilities for managing a suite of data integration projects including capabilities for provisioning and managing storage and processing power.

In some embodiments, techniques disclosed herein are used to perform data integration functions or operations that present artifacts to represent the state of data integrity. Data integration is presented as verifiable artifacts in some embodiments.

Illustrative embodiments integrate sets of data specific to individual domains. Examples of domains include Energy, Transportation, Manufacturing, Logistics, Pharmaceuticals, Retail, Construction, Entertainment, Real Estate, Agriculture, Shipping, Security, Defense, Law, Health Care, Education, Tourism, and Finance.

A meta catalog may comprise a repository of ontologies acquired from various industry domains. In various embodiments, acquisition of these ontologies are integrated with other ontologies.

In some embodiments, an ontology control interface uses ontology acquired from one or more ontology sources. For each member Ø of the set of ontologies, operations are performed by the system to expose limited Objects from one repository with one view. In the first operations of the system, the user selects the data objects to expose. Next, the system determines if the object may be transformed contemporaneous with exposure. If so, the system operation proceeds to provide additional functions for transformation of the data prior to exposure.

In the following description, for the purposes of explanation, specific details are set forth in order to provide a thorough understanding of embodiments of the invention. However, it can be apparent that various embodiments may be practiced without these specific details.

In some embodiments, the systems may be configured as a distributed system where one or more components of the system are distributed across one or more target networks.

Larger integration projects can be created with verification of successful integration. This can allow for further integration of data while preserving ability to determine data provenance.

In various embodiments, ongoing improvements are leveraged through a version control system with additional tools to track persons and represent the data state. Knowing the data state enables developers to improve data prior to integration, working out errors and otherwise fixing difficulties in data cleanliness. Problems that may arise from integrations may then be followed up by determining provenance of data and where in the larger system the flawed data may now be present.

In various embodiments, techniques disclosed herein may be used to perform data migration and similar operations efficiently and accurately, without data or meta-information loss.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a memory configured to store a mapping from a source schema of a source data to a target schema of target data, wherein the mapping defines relationship between source data and tables of the source data corresponding the target data and tables of target data, wherein the mapping is expressed in a declarative language; and
    a processor coupled to the memory and configured to migrate to the target schema an instance of the source data organized according to the source schema, wherein the migrating, based on left-Kan extensions via the mapping to transform the source data, is implemented by a chase engine executed on a computer for invoking an chase algorithm to perform an ordered sequence of steps comprising:
    adding, based on one or more data integrity constraints of the target schema, a bounded layer of new elements to a set of the tables of the target data when a chase state has been initialized, wherein the set of the tables stores a current canonical chase state related with the migrating the source data to the target schema, wherein the data integrity constraints include equations in the target schema, wherein the left-Kan extensions are computed by the chase algorithm;
    adding coincidences as fire equality-generating dependencies to the current canonical chase state based on the one or more data integrity constraints of the target schema and the mapping from the source schema to the target schema, wherein the coincidences are induced functionality by a function that maps equivalences between the source schema and the target schema; and
    merging equal elements of the new elements based on the coincidences to output a final chase state that is uniquely isomorphic to output tables, wherein the output tables represent entries being subsumed into identical entries; and
        repeating the ordered sequence of steps iteratively until an end condition is met, wherein the end condition is based at least in part on a determination that no further new coincidences exist to be added.

2. The system of claim 1, wherein the processor is configured to parse and interpret the declarative language to determine and implement the mapping.

3. The system of claim 1, wherein a coincidence is associated with an equivalency-adding dependency.

4. The system of claim 1, wherein a coincidence is induced by the target schema's data integrity constraint.

5. The system of claim 1, wherein a coincidence is induced by the mapping.

6. The system of claim 1, wherein a coincidence is associated with an equivalence relation.

7. The system of claim 1, wherein the processor is further configured to initialize canonical chase state.

8. A method to migrate to a target schema an instance of source data organized according to a source schema, comprising:
    storing, by a computer, in a memory a mapping from the source schema of the source data to the target schema of target data, wherein the mapping defines relationship between the source data and tables of the source data corresponding the target data and tables of target data, wherein the mapping is expressed in a declarative language; and
    migrating, by a chase engine executed on the computer to implement a chase algorithm, to the target schema an instance of the source data organized according to the source schema, wherein the migrating, based on left-Kan extensions via the mapping to transform the source data, includes performing an ordered sequence of steps comprising:
    adding, based on one or more data integrity constraints of the target schema, a bounded layer of new elements to a set of the tables of the target data when a chase state has been initialized, wherein the set of the tables stores a current canonical chase state related with the migrating the source data to the target schema, wherein the data integrity constraints include equations in the target schema, wherein the left-Kan extensions are computed by the chase algorithm;
    adding, coincidences as fire equality-generating dependencies to the current canonical chase state based on the one or more data integrity constraints of the target schema and the mapping from the source schema to the target schema, wherein the coincidences are induced functionality by a function that maps equivalences between the source schema and the target schema; and
    merging equal elements of the new elements based on the coincidences to output a final chase state that is uniquely isomorphic to output tables, wherein the output tables represent entries being subsumed into identical entries; and
    repeating the ordered sequence of steps iteratively until an end condition is met, wherein the end condition is based at least in part on a determination that no further new coincidences exist to be added.

9. The method of claim 8, wherein the end condition is based at least in part on a determination that no further new elements exist to be added.

10. The method of claim 8, wherein a coincidence is associated with an equivalency-adding dependency.

11. The method of claim 8, wherein a coincidence is induced by the target schema's data integrity constraint.

12. The method of claim 8, wherein a coincidence is induced by the mapping.

13. The method of claim 8, wherein a coincidence is associated with an equivalence relation.

14. A computer program product embodied in a non-transitory computer readable medium and comprising computer instructions for:

storing in a memory a mapping from a source schema of a source data to a target schema of target data, wherein the mapping defines relationship between source data and tables of the source data corresponding the target data and tables of target data, wherein the mapping is expressed in a declarative language; and migrating, by a chase engine executed on a computer to implement a chase algorithm, to the target schema an instance of the source data organized according to the source schema, wherein the migrating, based on left-Kan extensions via the mapping to transform the source data, includes performing an ordered sequence of steps comprising:

adding, based on one or more data integrity constraints of the target schema, a bounded layer of new elements to a set of the tables of the target data when a chase state has been initialized, wherein the set of the tables stores a current canonical chase state related with the migrating the source data to the target schema, wherein the data integrity constraints include equations in the target schema, wherein the left-Kan extensions are computed by the chase algorithm;

adding coincidences as fire equality-generating dependencies to the current canonical chase state based on the one or more data integrity constraints of the target schema and the mapping from the source schema to the target schema, wherein the coincidences are induced functionality by a function that maps equivalences between the source schema and the target schema; and merging equal elements of the new elements based on the coincidences to output a final chase state that is uniquely isomorphic to output tables, wherein the output tables represent entries being subsumed into identical entries; and repeating the ordered sequence of steps iteratively until an end condition is met, wherein the end condition is based at least in part on a determination that no further new coincidences exist to be added.

15. The computer program product of claim 14, further comprising computer instructions to parse and interpret the declarative language to determine and implement the mapping.

* * * * *